US011392815B1

(12) United States Patent
Huijsing et al.

(10) Patent No.: US 11,392,815 B1
(45) Date of Patent: Jul. 19, 2022

(54) INTEGRATED RFID TAGS IN PASSENGER AIRCRAFT

(71) Applicant: Koninklijke Fabriek Inventum B.V., Nieuwegein (NL)

(72) Inventors: Hans Huijsing, Ijsselstein (NL); Arnau Castillo Gonzalez, Maarssen (NL)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/135,164

(22) Filed: Dec. 28, 2020

(51) Int. Cl.
*G06K 19/07* (2006.01)
*G06K 19/077* (2006.01)

(52) U.S. Cl.
CPC ... *G06K 19/0723* (2013.01); *G06K 19/07758* (2013.01)

(58) Field of Classification Search
CPC .................. G06K 19/0723; G06K 19/07758
USPC ......................................................... 235/385
See application file for complete search history.

(56) References Cited

U.S. PATENT DOCUMENTS

| 8,052,061 | B2 | 11/2011 | Warther |
| 8,952,813 | B2 | 2/2015 | Boss et al. |
| 9,817,113 | B2 | 11/2017 | Loftis et al. |
| 2006/0163430 | A1 | 7/2006 | Cordina et al. |
| 2012/0306651 | A1* | 12/2012 | Hall ................. G08B 13/19695 340/572.1 |
| 2016/0152350 | A1 | 6/2016 | Puentes et al. |
| 2017/0328759 | A1* | 11/2017 | Nicks ..................... B64D 45/00 |

* cited by examiner

*Primary Examiner* — Allyson N Trail
(74) *Attorney, Agent, or Firm* — Locke Lord LLP; Joshua L. Jones; Gabrielle L. Gelozin

(57) ABSTRACT

A system comprises a plurality of RFID readers distributed throughout an aircraft cabin. The RFID readers are configured to read RFID tags attached to luggage items. The system also includes a controller operatively connected to the plurality of RFID readers. The controller includes machine readable instructions configured to cause the controller to receive RFID readings from the plurality of RFID readers and track locations of the luggage items within the aircraft cabin. A method comprises tracking RFID tags affixed to luggage items within an aircraft cabin to monitor distribution and/or movement of the luggage items within the aircraft cabin. Tracking RFID tags includes detecting the RFID tags using a plurality of RFID readers located in overhead bins of the aircraft cabin.

12 Claims, 2 Drawing Sheets

INTEGRATED RFID TAGS IN PASSENGER AIRCRAFT

BACKGROUND

1. Field

The present disclosure relates to integrated aircraft systems, and more particularly to aircraft systems for tracking luggage items.

2. Description of Related Art

Airports and airlines attach bar codes to passenger luggage to check baggage. The barcodes facilitate identifying baggage items at various points within the airport en route to delivery to a departing aircraft, and again from an arriving aircraft, through a destination airport, and to baggage claim. The bar codes can even be used after the baggage arrives at a baggage claim to assist with identifying an individual's luggage, including late or lost baggage.

The conventional techniques have been considered satisfactory for their intended purpose. However, there is an ever present need for improved systems and methods for improved luggage tracking. This disclosure provides a solution for this need.

SUMMARY

A system comprises a plurality of RFID readers distributed throughout an aircraft cabin. The RFID readers are configured to read RFID tags attached to luggage items. The system also includes a controller operatively connected to the plurality of RFID readers. The controller includes machine readable instructions configured to cause the controller to receive RFID readings from the plurality of RFID readers and track locations of the luggage items within the aircraft cabin.

The plurality of RFID readers can include RFID readers positioned to read RFID tags in overhead bins of the aircraft cabin. The controller can include machine readable instructions configured to cause the controller to inform a user of available overhead bin space. The controller can include machine readable instructions configured to assist a user in redistributing luggage items in the overhead bins of the aircraft cabin to improve aircraft weight distribution. The controller can also receive RFID data from the readers and identifies luggage items that need to be moved and notifies the user. The controller can be configured to inform the user to where the luggage items that need to be moved should be moved within the overhead bins.

The controller can be configured to receive RFID data from one or more of the RFID readers indicative of a luggage item being removed from an overhead bin during flight. The controller can be configured to alert the user of inappropriate or unauthorized removal of luggage items from the overhead bins. The controller can be configured to alert the user of passengers with too many luggage items. The plurality of RFID readers can include RFID readers positioned to read RFID tags in rolling in an aisle of the aircraft cabin. The controller can be configured to alert the user of luggage items left behind by passengers and detected by the RFID readers after passengers have disembarked the aircraft cabin.

A method comprises tracking RFID tags affixed to luggage items within an aircraft cabin to monitor distribution and/or movement of the luggage items within the aircraft cabin. Tracking RFID tags includes detecting the RFID tags using a plurality of RFID readers located in overhead bins of the aircraft cabin.

The method can include informing a user of where overhead bin space is available to receive luggage items within the aircraft cabin. The method can include informing a user how to redistribute the luggage items to improve aircraft weight distribution. The method can include collecting RFID data from tracking the RFID tags for a plurality of flights, and optimizing boarding and/or deboarding process (es) based on the RFID data.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
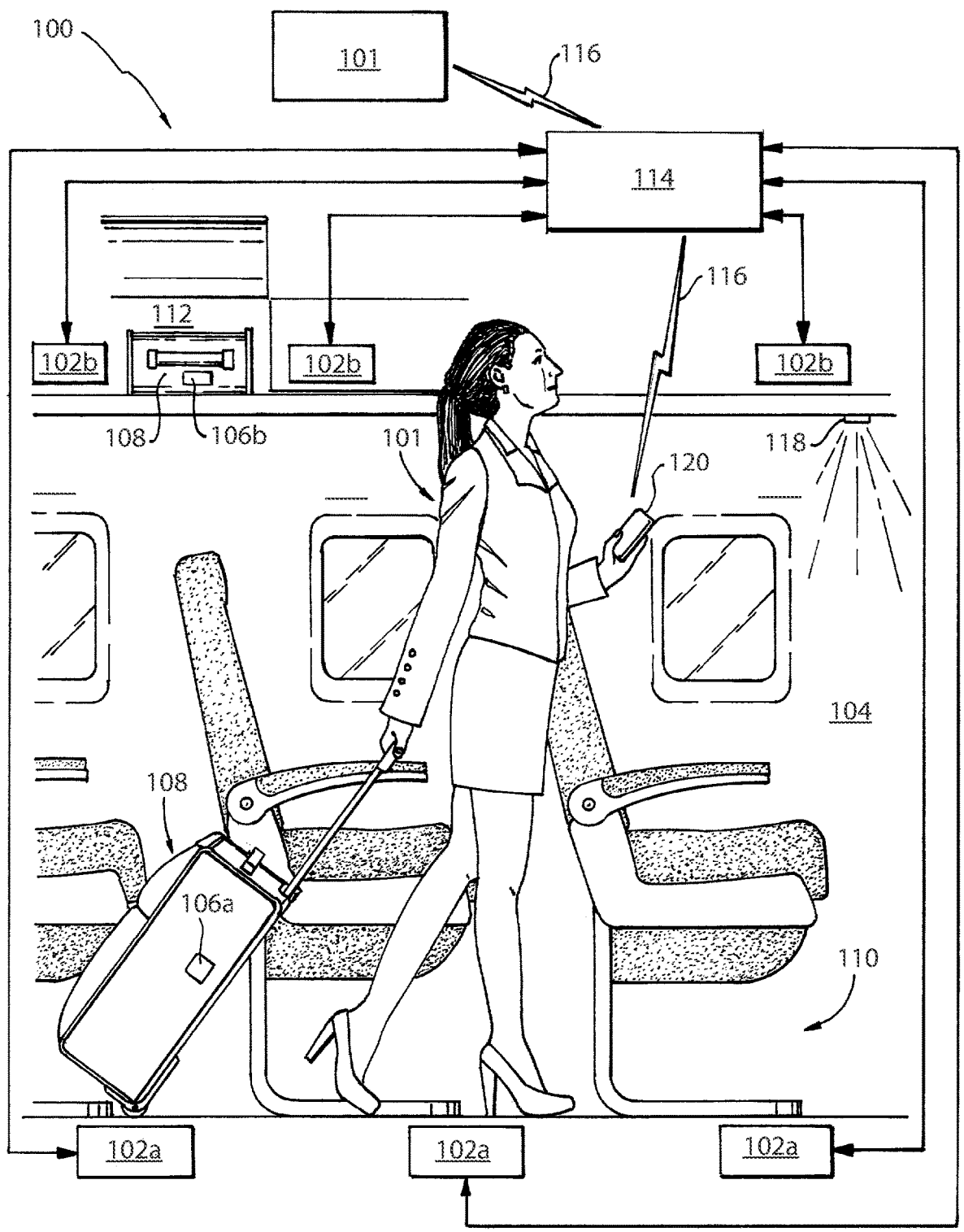
FIG. 1 is a schematic interior view of an embodiment of an aircraft cabin constructed in accordance with the present disclosure, showing the aircraft cabin outfitted with a plurality of RFID readers.

Reference will now be made to the drawings wherein like reference numerals identify similar structural features or aspects of the subject disclosure. For purposes of explanation and illustration, and not limitation, a partial view of an embodiment of an aircraft cabin equipped with a plurality of RFID readers in accordance with the disclosure is shown in FIG. 1 and is designated generally by reference character 100. Other embodiments of systems in accordance with the disclosure, or aspects thereof, are provided in FIGS. 2A-3, as will be described. The systems and methods described herein can be used to improve luggage tracking within an aircraft.

A system 100 for tracking luggage 108 on passenger aircraft can include a plurality of RFID readers 102 distributed throughout an aircraft cabin 104. The RFID readers 102 can be configured to read RFID tags 106 (e.g. RFID tag 106*a* in FIG. 1) attached to luggage items 108, for example, the RFID readers 102 can be RFID readers 102*a* positioned in the floor of an aisle 110 to read RFID tags 106 rolling in the aisle 110 of the aircraft cabin 104. Additionally, or alternatively, the plurality of RFID readers 102 can include RFID readers 102*b* positioned to read RFID tags 106 (e.g. RFID tab 106*b* in FIG. 1) in overhead bins 112 of the aircraft cabin 104.

Figure 2A:
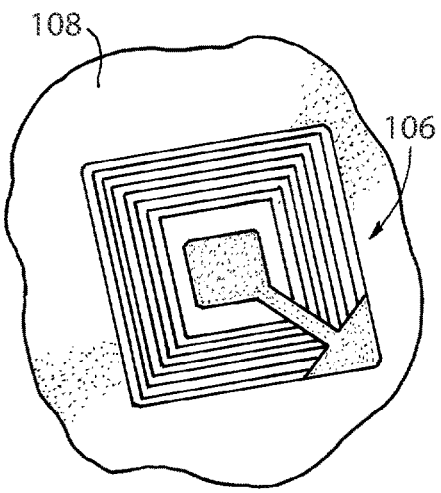
FIG. 2A is a schematic plan view of an example of an RFID tag read by the RFID readers of FIG. 1.
Figure 2B:
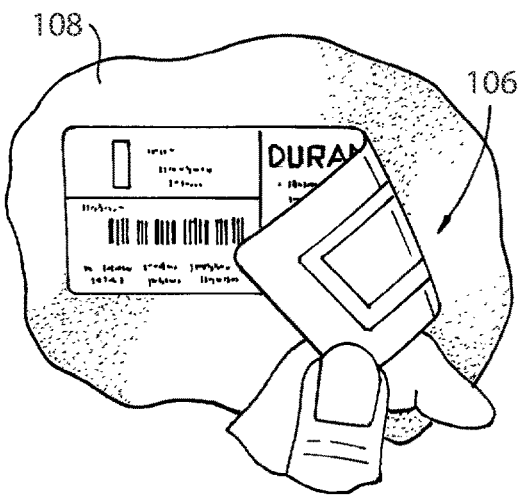
FIG. 2B is a schematic plan view of an example of another RFID tag read by the RFID readers of FIG. 1.
Figure 2C:
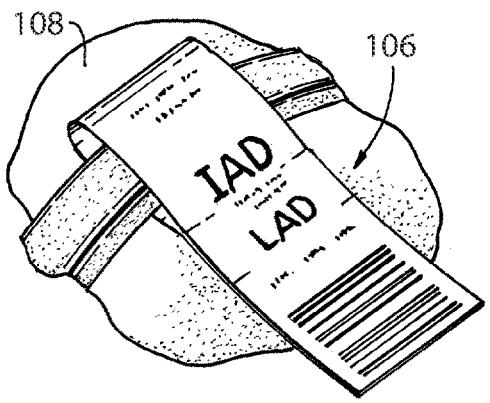
FIG. 2C is a schematic plan view of an example of another RFID tag (e.g. within a luggage tag) read by the RFID readers of FIG. 1.

As shown in FIGS. 2A-2C, the RFID tags 106 may be durably affixed to luggage items 108 such as in conventional luggage tags, sticker tags, and/or sticker tags on items within the luggage. For example, as shown in FIG. 2C, an RFID tag 106 may be included in a luggage tag either by durably fixing an RFID tag 106 to the label, or the RFID tag 106 may be integrally formed with the luggage tag so that there need not be additional handling of the RFID tags 106 by airport crew. Additionally, a user's 101 frequent flyer (or similar rewards type) card may include an RFID tag 106 readable by the plurality of RFID sensors 102, configured to be read by an airport or aircraft media system (not shown) in addition to the already discussed RFID sensors 102.

Shown schematically in FIG. 1, the system 100 can include a controller 114 operatively connected to the plurality of RFID readers 102 through any suitable connection means, e.g. wired or wireless connection. The controller 114 can include machine readable instructions (e.g. any suitable software) configured to cause the controller 114 to receive RFID readings from the plurality of RFID readers 102, e.g. as represented by the double headed arrows between the controller 114 and the respective RFID readers 102. The machine readable instructions allow the controller to track locations of the luggage items 108 within the aircraft cabin 104.

The machine readable instructions can also be configured to cause the controller 114 to inform a user 101 (e.g. a passenger or flight staff) of available overhead bin space. The notification 116 can be any suitable notification, such as an external visual cue on overhead bins with space (e.g. light 118 on overhead bin 112), or a notification to a tablet or smart phone (e.g. smartphone 120), though it is appreciated that any suitable notification may be used. The machine readable instructions can further be configured to assist a user 101 in redistributing luggage items 108 in the overhead bins 112 to improve aircraft weight distribution.

In embodiments, the controller 114 can also receive RFID data from the respective RFID readers 102 that identifies luggage items 108 that need to be moved, and thus notifies a user 101 of such luggage. The controller 114 can then be configured to inform the user 101 of a new location the luggage items 108 should be moved within the overhead bins 112.

In embodiments, the controller 114 can be configured to receive RFID data from one or more of the RFID readers 102 indicative of a luggage item 108 being removed from an overhead bin 112 during flight. Further, the controller can be configured to alert the user 101 (e.g. flight staff) of inappropriate or unauthorized removal of luggage items 108 from the overhead bins 112. For example, duty free items, alcoholic beverages, or other unauthorized items may have their own RFID tags 106 such that when they are removed from the overhead bin 112, the respective RFID reader 102 and controller 114 can alert the flight attendant 101. The system 100 therefore provides a way to prevent and/or mitigate excessive alcohol consumption, inappropriate use of duty free or unauthorized items during flight, or removal of luggage at times during flight when passengers should be strapped in for example.

Further, the controller 114 can be configured to alert the user 101 (e.g. flight staff) of passengers with too many luggage items. The controller 114 may also be configured to alert a user 101 (e.g. passengers and/or flight staff) of luggage items 108 left behind by passengers or lost items and detected by the RFID readers 102 after passengers have disembarked the aircraft cabin 104.

Figure 3:
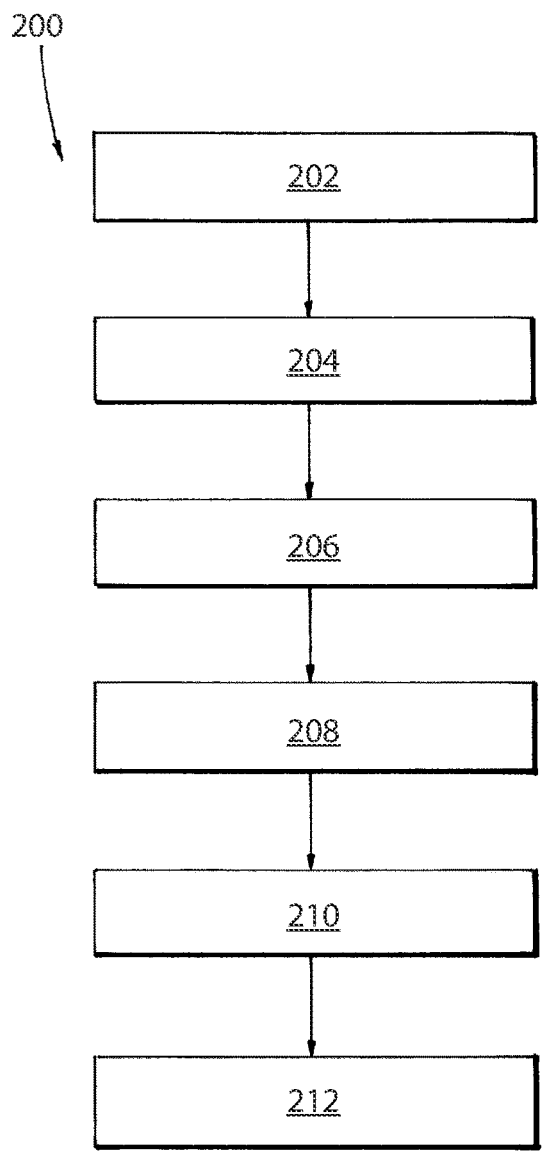
FIG. 3 is a box diagram showing a method of tracking luggage in an aircraft.

As shown in FIG. 3, a method 200 for tracking luggage 108 in an aircraft can include tracking RFID tags 106 affixed to luggage items 108 within an aircraft cabin 104 to monitor distribution and/or movement of the luggage items 108 within the aircraft cabin 104, as shown at box 202. As shown at box 204, tracking RFID tags 106 can include detecting the RFID tags 106 using a plurality of RFID readers 102 located in overhead bins 112 of the aircraft cabin 104, of within the carpet of an aisle 110 of the aircraft cabin 104.

The method can also include, as shown at box 206, informing a user 101 of where overhead bin space is available to receive luggage items 108. At box 208, the method 200 can include informing a user 101 how to redistribute the luggage items 108 to improve aircraft weight distribution. The method 200 further includes collecting RFID data from tracking the RFID tags 106 for a plurality of flights, shown at box 2010, and at box 212, the method 200 can include optimizing boarding and/or deboarding process(es) based on the RFID data.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art. The methods and systems of the present disclosure, as described above and shown in the drawings, provide for improved luggage tracking within the aircraft. Additionally, using an RFID tag system as described herein eliminates the need for line of sight when scanning, a present challenge suffered with systems like barcode scanning. While the apparatus and methods of the subject disclosure have been shown and described, those skilled in the art will readily appreciate that changes and/or modifications may be made thereto without departing from the scope of the subject disclosure.

What is claimed is:

1. A system comprising:
    a plurality of RFID readers distributed throughout an aircraft cabin, wherein the RFID readers are configured to read RFID tags attached to luggage items; and
    a controller operatively connected to the plurality of RFID readers, wherein the controller includes machine readable instructions configured to cause the controller to receive RFID readings from the plurality of RFID readers and track locations of the luggage items within the aircraft cabin, wherein the plurality of RFID readers includes RFID readers positioned to read RFID tags in overhead bins of the aircraft cabin, wherein the controller includes machine readable instructions configured to cause the controller to inform a user of available overhead bin space, wherein the controller is configured to receive RFID data from one or more of the RFID readers indicative of a luggage item being removed from an overhead bin during flight.

2. The system as recited in claim 1, wherein the controller includes machine readable instructions configured to assist a user in redistributing luggage items in the overhead bins of the aircraft cabin to improve aircraft weight distribution, wherein the controller receives RFID data from the readers and identifies luggage items that need to be moved and notifies the user.

3. The system as recited in claim 2, wherein the controller is configured to inform the user to where the luggage items that need to be moved should be moved within the overhead bins.

4. The system as recited in claim 1, wherein the controller is configured to alert the user of inappropriate or unauthorized removal of luggage items from the overhead bins.

5. The system as recited in claim 1, wherein the controller is configured to alert the user of passengers with too many luggage items.

6. The system as recited in claim 1, wherein the plurality of RFID readers includes RFID readers positioned to read RFID tags in rolling in an aisle of the aircraft cabin.

7. The system as recited in claim 1, wherein the controller is configured to alert the user of luggage items left behind by passengers and detected by the RFID readers after passengers have disembarked the aircraft cabin.

8. The system as recited in claim 1, wherein the RFID tags are integrally formed with a luggage tag, and/or wherein the RFID tags are durably adhered to the luggage items, and/or, wherein the RFID tags are included in a rewards card.

9. A method comprising:
    tracking RFID tags affixed to luggage items within an aircraft cabin to monitor distribution and/or movement of the luggage items within the aircraft cabin,
    collecting RFID data from tracking the RFID tags for a plurality of flights; and
    optimizing boarding and/or deboarding process(es) based on the RFID data.

10. The method as recited in claim 9, wherein tracking RFID tags includes detecting the RFID tags using a plurality of RFID readers located in overhead bins of the aircraft cabin.

11. The method as recited in claim 9, further comprising, informing a user of where overhead bin space is available to receive luggage items within the aircraft cabin.

12. The method as recited in claim 9, further comprising informing a user how to redistribute the luggage items to improve aircraft weight distribution.

* * * * *